Patented Dec. 31, 1946

2,413,412

UNITED STATES PATENT OFFICE 2,413,412

OIL-MODIFIED RESIN COMPOSITIONS

Arthur P. Mazzucchelli, Bloomfield, N. J., assignor to Bakelite Corporation, a corporation of New Jersey No Drawing. Application May 19, 1942, Serial No. 443,643

5 Claims. (Cl. 260—19)

This invention relates to compositions of phenol aldehyde resins modified by the incorporation of fatty oils and to their manufacture.

In a copending application Serial No. 351,217 filed August 3, 1940, which has since issued as U. S. Patent No. 2,362,018, there are described and claimed fatty oil-containing resinous compositions which are suitable as binders in dry processed molding material. According to that application resinous compositions are prepared by reacting a dehydrated Novolak type or slowly heat-hardening phenol aldehyde resin (using from 0.575 to 0.81 mol of formaldehyde to each mol of phenol) with a fatty oil in amount up to 60 per cent by weight of the resin and then incorporating from 2 to 15 per cent of a hardening agent to make the composition rapidly thermosetting upon the application of heat; to satisfactorily incorporate the fatty oil in the resin, it is necessary to adjust the pH value of the reacted phenol formaldehyde resin to between 2.3 and about 8.25 in correspondence to the amount of formaldehyde reacted into the resin, the higher formaldehyde resins being preferably adjusted to the upper pH value. It is further stated therein that the reaction with a resin having a pH value below 3.0 is sensitive to changes in operating conditions and increasingly difficult to control especially when the higher amounts of formaldehyde are employed, although a high formaldehyde ratio resin is desirable for speed of cure; conversely when lower ratios of formaldehyde are employed, the process is more readily operable at the lower pH values and favors the incorporation of fatty oils. In that application it is explained that the oil-resin reaction may proceed in three different directions: (a) polymerization of the oil, (b) polymerization of the resin, and (c) solubilization of the oil in the resin and the pH selected is that which favors the last of these reactions. The present application is a continuation-in-part of that application.

It has now been found that the addition of small amounts of acid catalyze and speed up the solubilization of a fatty oil in a dehydrated Novolak type resin and this at a reaction temperature considerably lower and a reaction time considerably less than hitherto considered necessary; material economies in the amount of heat and time required for the manufacturing process are thus made possible. Also fatty oils which are otherwise particularly difficult to solubilize in Novolak type resins, such as the high viscosity fatty oils produced by heat-polymerization under vacuum or oils of low unsaturation, can be incorporated substantially with the speed of the more easily dispersed blown oils. In addition Novolak type resins containing a high ratio of reacted formaldehyde are by this means made more amenable to the incorporation of fatty oils.

When mineral acids are employed, the amount required to catalyze the incorporation of a fatty oil into a Novolak type resin is usually about 4 per cent or less of the weight of the resin; above this amount either the resin or the fatty oil or both tend to gel before a complete dispersion has occurred, for acids generally have the property of gelling the fatty oils and the Novolak type resins. In an acid-catalyzed oil-resin mass the temperature also becomes critical; high temperatures (above 215° C.) promote rapidity of gelation with the result that only a portion of relatively small amount of oil may be incorporated with the resin before the entire mass becomes a useless cloudy gelled mixture.

The invention is more fully set forth in the examples which follow, but it is to be understood that these examples are merely illustrative of how the invention may be practiced with varying proportions and kinds of reactants. The proportions are by weight unless otherwise stated.

*Example 1.*—A Novolak type resin was made by reacting 5000 parts of phenol containing 10 per cent of ortho cresol with 2750 parts of 37 per cent aqueous formaldehyde and with 50 parts of 85 per cent phosphoric acid as a catalyst. The mixture of these ingredients was refluxed at atmospheric pressure with continuous mechanical agitation for about six hours, when upon testing it was found that practically all the formaldehyde had reacted in and the pH value of the mass as determined by the separate aqueous layer was 1.6; the resin was then dehydrated by heating to a temperature of 160° C. under atmospheric pressure, resulting in a yield of 5180 parts of a resin having a melting point of 74° C. (ball and ring method). This Novolak resin was used as a base resin for incorporation with a fatty oil.

*Example 1a.*—1000 parts of the base Novolak resin of the preceding example were melted in a steam heated vessel, and 20 parts of concentrated sulphuric acid previously dissolved in 40 parts of ethyl alcohol to facilitate rapid dispersion were then added with agitation. Heating was continued until the temperature rose to 150°–160° C. Then under constant stirring 208 parts of raw soya bean oil were added in such a manner that the temperature of the reaction mass was maintained above 130° C. When all the oil had been added the temperature was raised to 160° C., and at the end of 15–30 minutes the oil was found to be completely incorporated in the resin as evidenced by a bead on a plate which when cooled to room temperature remained clear. The resin mass was subjected to an additional half hour of heating at the same temperature under 28 inches of vacuum to remove remaining volatile material and then immediately discharged into pans to cool. The oil-modified resin was brittle and grindable to give a non-sintering powder at room temperature and had a melting point of 93° C.

*Example 1b.*—The same conditions were followed as in the preceding Example 1a but without added acid. 1000 parts of the base Novolak resin were melted and held at 160° C. in a steam heated vessel. To the melted resin were added 208 parts of raw soya bean oil with constant stirring; the mass was held at 165°–170° C. until the resin gave a clear bead on cooling to room temperature. The reaction mass required about 20 hours of heating before this test was passed, after which it was heated to 170° C. and bodied under a vacuum of 28 inches so that the resinous mass would be brittle at room temperature; this step required an additional 20 hours, and produced an oil-modified resin having a melting point of 86° C.

*Example 1c.*—To show the effects of high temperature, 1000 parts of the base Novolak resin and 208 grams of raw soya bean oil were heated to 290°–300° C. with continuous stirring in a gas-fired vessel. The oil dissolved readily within a few minutes in the resin at this high temperature; but when an attempt was made to remove volatile matter under vacuum, the viscosity of the mass increased so rapidly that before it could be removed from the vessel it had gelled.

To prevent the gelling at high temperature, the example was repeated with the residual phosphoric acid catalyst in the Novolak resin neutralized to the extent of about 80 per cent by adding to the same quantity of melted resin 2.25 parts of barium hydroxide, Ba(OH)$_2$·8H$_2$O, dissolved in hot water; the pH value of the resin-water mixture was thus increased to 3.8. The resin was then heated to expel the water after which 208 parts of raw soya bean oil were added, and the mass was heated to 300° C. and held at this temperature with constant stirring until the oil modified resin gave a clear bead on cooling which occurred in 15 minutes. Volatiles were then removed by continued heating at the same temperature under 28 inches of vacuum, and the resin mass then discharged into pans to cool. A yield of 1020 parts of oil modified resin having a melting point of 96° C. was obtained.

Repeating this same example at high temperature, with the exception that the original acid catalyst was completely neutralized and the resin mass made slightly alkaline with barium hydroxide, it was found that upon heating the raw soya bean oil and the resin to 300° C. incipient gelation of the reaction mass had begun before the oil had been completely dispersed; this required the immediate discharge of the reaction mass from the vessel.

A comparison of these examples clearly shows that the addition of more acid to a Novolak resin that still has present in it the original acid condensation catalyst, as in Example 1a, enables a fatty oil to be incorporated in a Novolak type resin with rapidity at moderate temperatures or below 175° C.; in contrast the absence of added acid greatly prolongs the reaction period at moderate temperatures as shown by Example 1b, though with sufficient amount of the original acid present to give a pH of 1.6 (0.95 per cent of phosphoric acid) the reaction proceeds in a manner to solubilize the oil in the resin without gelation and yields a homogeneous product. A high temperature (300° C.) reaction as illustrated by Example 1c, however, so speeds up the reaction at a pH of 1.6 that gelation takes place substantially simultaneously with solubilization of the oil; and on the other hand complete neutralization (pH of more than 8.25) in a high temperature reaction also is ineffective due to gelation of the resin before complete dispersal of the oil therein. From this the conclusion follows that a moderate reaction temperature (215° C. and below) does not have the limitations of a narrow pH range associated with high reaction temperatures (215° C. and above).

The following examples illustrate the use of other fatty oils in differing proportions and with various phenol aldehyde resins and acid catalysts.

*Example 2.*—A base Novolak type resin, illustrating a higher formaldehyde content (0.81 mol per mol of phenol) than that described in Example 1, was made by reacting 5000 parts of phenol containing 10 per cent of ortho cresol with 3500 parts of 37% aqueous formaldehyde and with 50 parts of 85 per cent strength phosphoric acid as a catalyst; the mixture before reaction had a pH of 1.1–1.25. The mixture was refluxed in a steam heated vessel for six hours with continuous stirring until 96.3 per cent of the formaldehyde had reacted and the pH value of the undehydrated resin was 1.6. The resin was dehydrated by heating under atmospheric pressure to 160° C. and then discharged from the vessel; a yield of 5500 parts of a resin having a melting point of 72° C. was obtained which was used in the following subsidiary examples.

500 parts of the above Novolak resin were heated with 110 parts of blown soya bean oil to a temperature of 170° C. in a steam heated vessel. The mixture was at first cloudy but a clear bead when cold was obtained after about 15 hours of reaction at 165°–175° C. with constant stirring. The modified oil-resin was heated under 28 inches of vacuum for one-half hour at the same temperature to eliminate volatiles whereupon it was discharged into pans for cooling, and a sample of the cooled mass had a melting point of 111° C. With the same reactants and proportions a solubilization of the fatty oil into the Novolak resin in one-tenth the time was secured when 15 parts of 85 per cent phosphoric acid (3% on the weight of the Novolak resin) previously dissolved in alcohol was added to the melted Novolak resin and immediately followed with the addition of the fatty oil; in this instance only one and one-half hours reaction at 165° C. sufficed to incorporate the fatty oil into the Novolak resin, and 5 minutes of the vacuum treatment was sufficient to give a homogeneous oil modified resin which had a melting point of 107° C. Since the oil-modified-resins tend to gel easily in the presence of such a quantity of acid, it is preferable to neutralize the added acid, after the fatty oil is completely incorporated with any alkali which will form a stable salt with the acid; powdered slaked lime dispersed in a small amount of water is suitable for this purpose, and it is added to the resin immediately after solubilization of the oil has taken place and prior to the vacuum treatment step.

With sulphuric acid as the solubilization catalyst, a lesser quantity is required than in the case of phosphoric acid. For instance, with 2 per cent of sulphuric acid based on the weight of the Novolak type resin the same reactants in the same amounts gave a clear oil-modified resin in about 15 minutes; the excess acid in the oil-modified resin was then neutralized with a water dispersion of ground lime, and the water and other volatiles were removed by subjecting the resin to a vacuum of 28 inches for 5 minutes at a temperature of 170° C.

The resin of this example had a melting point of 112° C. and contained about 20 per cent of incorporated oil.

*Example 3.*—Oil-modified resins containing blown grapefruit seed oil show the decided impetus given to the solubilization of the oil into the resin when the Novolak resin is sufficiently acidified.

500 parts of the base Novolak resin of Example 2 were heated with 110 parts of blown grapefruit seed oil to 175° C. and held at this temperature with agitation until the oil was completely dissolved in the resin giving a clear bead when cold. This required a total of 37 hours after which a vacuum was applied to the resin for one-half hour to remove volatiles. The finished resin had a melting point of 103° C.

Repeating this example with the addition of 2 per cent of concentrated sulphuric acid based on the Novolak resin enabled the oil to be completely dispersed in the resin after only 16 minutes of reaction time at 150°–165° C. The excess acid was then neutralized by adding a concentrated aqueous solution of sodium hydroxide; dehydration of the oil modified resin and the removal of unreacted volatile matter was accomplished by heating for 5 minutes at 170° C. under a high vacuum. The resin was discharged into pans, and a sample showed a slightly higher melting point of 106° C.

*Example 4.*—High viscosity heat-bodied fatty oils are usually quite difficult to incorporate into a Novolak resin; however when the Novolak resin is sufficiently acidified, these oils readily disperse themselves in the resin at moderate temperatures.

500 parts of the base Novolak resin prepared for Example 2 and 110 parts of a heat-bodied linseed oil with a viscosity value of M17 (Gardner-Holdt scale) (which is sold under the trade name of "OKO" oil) were reacted together with 2 per cent of concentrated sulphuric acid at a temperature of 150° C. for 35 minutes to yield a clear homogeneous oil-modified resin. The excess acid present in the resin was neutralized by the addition of an aqueous solution of barium hydroxide; the water and other volatile matter in the resin was removed by heating the resin mass to 170° C. for 15 minutes under high vacuum, yielding a resin containing about 20 per cent of combined oil and with a melting point of 105° C.

*Example 5.*—A base resin of the Novolak type was prepared from 100 parts of phenol (derived from coal tar and containing 10% of ortho cresol) and 70 parts of 37% aqueous formaldehyde in the presence of 1 part of 85% phosphoric acid; pure synthetic phenol can be substituted. 500 parts of the resin so prepared were heated to 150° C., and 3 parts of sulphuric acid dissolved in 10 parts of alcohol were added with stirring; this amounted to 0.6% of sulphuric acid based on the weight of the resin.

The mass was again brought to a temperature of 150° C. whereupon 125 parts of blown soya bean oil were added. The temperature was raised to 160°–165° C. and the reaction continued for 40–45 minutes or until a clear bead when cold was obtained. The mass was preferably but not necessarily neutralized with 2.3 parts of lime dispersed in 5 parts of water whereupon a vacuum of 15 inches was applied for 10 minutes. The discharged resin had a melting point of about 100° C.

*Example 6.*—200 parts of the base resin of Example 5 were heated to 150° C. and 8 parts of p-toluene sulphonic acid dissolved in 15 parts of alcohol were added. The temperature was again brought up to 150° C. and while stirring there were added 50 parts of alkali-refined fish oil. The mass was reacted for 16 minutes at 150°–165°. C. or until a clear bead when cold was obtained. The discharged resin had a melting point of 110° C.

*Example 7.*—200 parts of the base resin of Example 5 were treated as in Example 1 with 4 parts of concentrated sulphuric acid dissolved in 10 parts of alcohol. For the oil there were substituted 50 parts of dehydrated castor oil. This mass gave a clear bead when heated for 12 minutes at 150° C. and the resulting resin had a melting point of about 100° C.

*Example 8.*—100 parts of the base resin of Example 5 were melted and raised to 150° C.; to this were added 4 parts of p-toluene sulphonic acid dissolved in 10 parts of alcohol and the temperature again brought to 150° C. 67 parts of blown soya bean oil were added to the resin and the mass reacted for 20 minutes at 150°–160° C. or to a clear bead when cold. In this example the oil constituted about 40% based on the weight of resin and the resin showed some tendency to gel in the removal of volatiles due to the presence of the excess acid; it is therefore preferable in preparing high oil content resins to reduce the quantity of acid catalyst which is added. The resin product had a melting point of about 103° C.

*Example 9.*—Instead of incorporating the acid catalyst in the resin it can be first added to the oil and the resin thereupon included; this procedure is applicable more particularly to raw oils of low unsaturation, since blown oils and oils with conjugated double bonds are likely to gel upon mixing with the acid catalyst. To illustrate, 50 parts of raw soya bean oil had added thereto 2 parts of concentrated sulphuric acid dissolved in 5 parts of ethyl alcohol; the mixture was allowed to stand for 5 minutes with stirring, and it was then heated rapidly to 140° C. There were added with stirring 200 parts of the resin of Example 5 previously heated to 150° C.; the mixture was quite cloudy but upon reacting for 13 minutes at 160° C. with stirring it became homogeneous and a clear bead when cold was obtained. The mass was neutralized with 3.1 parts of lime in 5 parts of water and the heating was continued at 160° C. for 10 minutes. The discharged resin was clear and grindable.

*Example 10.*—The acids of fatty oils, such as linseed oil fatty acids or fatty acids having 7 carbon atoms or more, can be substituted for the fatty oils. When 100 parts of the Novolak resin of Example 5 were treated with 2 parts of concentrated sulphuric acid in 10 parts of alcohol under the conditions of Example 5 and then 25 parts of linseed oil fatty acids were incorporated, it was found that a reaction for 5 minutes at 160°–165° C. gave a very clear bead. The product upon removal of volatiles had a melting point of 80° C.

*Example 11.*—Resins of a Novolak nature and suitable for the purposes of this invention can be prepared from dihydroxy phenols as well as the monohydroxy phenols provided the formaldehyde proportion is reduced. As an example, 1500 parts of resorcinol were heated to 120° C. and 551 parts of 37% aqueous formaldehyde (ratio of .5 mol formaldehyde to 1 mol of resorcinol) were slowly added over a period of 30–45 minutes; this mixture was refluxed for about 30 minutes or until substantially all the formaldehyde was reacted. The resin mass was dehydrated by heating to 150° C. and by the application of a 27 inch vacuum for 7 minutes. A yield of 1577 parts of resin resulted with a melting point of about 80° C.

*Example 11a.*—1000 parts of the resorcinol resin were melted, and 700 parts of blown soya bean oil were incorporated with stirring. The mass was reacted for 3 hours at 215° C. with stirring and dehydrated under vacuum. The discharged resin was clear and grindable having a melting point of 90° C.; it had an oil content of about 41 per cent.

*Example 11b.*—1000 parts of the resorcinol resin were melted and 700 parts of blown soya bean oil added with stirring. To the mass were added 10 parts of concentrated sulphuric acid dissolved in 40 parts of acetone and the whole was reacted at 150° C. for several minutes or until clear. A 22 inch vacuum was applied for 5 minutes and the resin was discharged. It had a melting point of 100° C.

*Example 12.*—Hydrogenated fatty oils have been found to be well suited for the preparation of oil-modified resins. 100 parts of the resin described in Example 2 were melted, and 3 parts of sulphuric acid dissolved in 10 parts of alcohol were included. The mixture was heated to 140° C. whereupon 25 parts of approximately 80% hydrogenated cotton seed oil were incorporated with stirring. The mass was heated at 150° C. for about 5 minutes and then raised to 160° C. with heating continued for about 20 minutes under agitation. By this time the mass was clear and homogeneous, and it was neutralized with 2.3 parts of lime dispersed in 10 parts of water. It was again brought to a temperature of 160° C. and the volatiles removed. The product had a melting point of 93° C. and was free from any cloudiness.

*Example 13.*—100 parts of the base Novolak resin of Example 5 were melted and 4 parts dimethyl sulphate dissolved in 10 parts alcohol were added with stirring. The mixture was heated to 150° C., and 25 parts blown soya bean oil were added. The mixture was again heated to 150°–160° C. and reacted with stirring for 15 minutes, after which a dark colored but clear bead was obtained. The final resinous product had a melting point of 100° C. In this example it is believed that the dimethyl sulphate methylates the resin, liberating $H_2SO_4$ which then acts as a catalyst.

In general the invention has application to resins of the Novolak or slowly heat-hardening types of resins, i. e., resins which when used as binders in molding material do not harden by heat within a time range useful commercially and require the addition of a hardening agent in amounts from 2–15 per cent to accelerate their heat-hardenability. Different phenols can be used to prepare the base Novolak resin including phenol proper, cresols and xylenols and dihydroxy phenols such as resorcinol, catechol, hydroquinone, etc.; other alkyl and aryl substituted phenols give resins whose solubilization in oils can be promoted by the catalysts herein disclosed though as a rule the resins made therefrom are sufficiently oil-soluble without their addition. The aldehydes suitable for reaction with the phenols include formaldehyde, acetaldehyde, furfuraldehyde, etc., their polymers and compounds engendering methylene groups such as hexamethylenetetramine; with the more highly substituted aldehydes, the resins may be sufficiently oil-soluble without the catalyst. The proportion of aldehyde to phenol can be varied from 0.5–0.7 mol per mol of dihydroxy phenols to 0.5–0.9 mol per mol of phenol.

Fatty oils of various degrees of unsaturation including the known drying, semi-drying and non-drying oils of fish and vegetable origin, and processed oils, as the oxidized, heat-polymerized, hydrogenated, dehydrated, etc., can be solubilized in the resins in accordance with this invention. In place of the oils their acids or fatty acids having seven carbon atoms or more, such as caprylic, lauric, oleic, linoleic, etc., can be used. The heat-polymerized oils are particularly effective in the preparation of resins used in compositions exposed to high temperatures or requiring resistance to heat. The percentage of oil in the oil-modified resin normally varies from 10 to 60 per cent when used in molding compositions and the like; for other purposes as coatings and the like more oil can be added depending upon flexibility or other properties desired.

Solubilizing catalysts comprise the hydrates of phosphorus pentoxide, sulfuric acid (including oleum) and its compounds such as organic sulfonic acids (as phenol-sulfonic, toluene-sulfonic, naphthalene-sulfonic), alkyl sulfuric acids (as ethyl sulfuric), halogen sulfonic acids (as chlorsulfonic acid) and compounds which under reacting conditions liberate or form sulfuric acid or derivatives of the foregoing types such as $SO_3$, $Ca(SO_4).H_2SO_4$, dimethyl sulfate, etc. The sulphuric acid compounds are defined herein as compounds of sulphur trioxide having the empirical formula $R-SO_3-H$ wherein R is a radical from the group consisting of halogen, hydroxyl, alkyl, aryl, and $-OX$ wherein X is an alkyl radical. Under this formula it is intended to include the foregoing compounds when liberated or formed under the reaction conditions. The quantity of catalyst used in general varies from 0.1 to 4.0 per cent calculated as phosphoric or sulfuric acid on the weight of resin; higher percentages can be used with corresponding danger of premature gelation especially at temperatures ranging from 150°–215° C., but they are tolerated when the reaction temperatures are within the range of 115°–150° C.

Oil-modified resins as herein described find particular utility, when combined with hardening agents such as hexamethylenetetramine and other methylene-bearing compounds, as binders for fillers in molding materials, brake linings, grinding wheels, etc. They are useful as heat-setting adhesives in the manufacture of plywood and also for coatings; for these uses the hardening agent need not necessarily be included particularly if the catalytic acid is not neutralized.

What is claimed is:

1. Process of preparing an oil-modified resinous composition which comprises reacting at a temperature ranging from 115° C. to 215° C. a normally oil-insoluble, dehydrated Novolak phenol-aldehyde resin with a fatty material selected from the group consisting of raw fatty oils, oxidized fatty oils, heat-polymerized fatty oils, dehydrated fatty oils, hydrogenated fatty oils and fatty acids having at least 7 carbon atoms and in the presence of an acidic catalyst selected from the group consisting of the hydrates of phosphorus pentoxide, dialkyl sulphates,

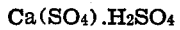

sulphur trioxide and its compounds having the formula R—SO₃H wherein R is a radical selected from the group consisting of halogen, hydroxyl and aryl radicals and —OX wherein X is an alkyl radical, said catalyst calculated as phosphoric acid or sulphuric acid being present in amount between 0.1 and 4.0 percent by weight of the Novolak resin.

2. Process of preparing an oil-modified resinous composition which comprises reacting at a temperature ranging from 130° C. to 175° C. a normally oil-insoluble, dehydrated Novolak phenol-aldehyde resin with a fatty material selected from the group consisting of raw fatty oils, oxidized fatty oils, heat polymerized fatty oils, dehydrated fatty oils, hydrogenated fatty oils and fatty acids having at least 7 carbon atoms and in the presence of an acidic catalyst selected from the group consisting of the hydrates of phosphorus pentoxide, dialkyl sulphates,

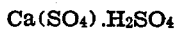

sulphur trioxide and its compounds having the formula R—SO₃H wherein R is a radical selected from the group consisting of halogen, hydroxyl and aryl radicals and —OX wherein X is an alkyl radical, said catalyst calculated as phosphoric acid or sulphuric acid being present in amount between 0.1 and 4.0 percent by weight of the Novolak resin.

3. Process of preparing an oil-modified resinous composition which comprises reacting at a temperature ranging from 115° C. to 215° C. a normally oil-insoluble, dehydrated Novolak phenol-aldehyde resin with a fatty material selected from the group consisting of raw fatty oils, oxidized fatty oils, heat-polymerized fatty oils, dehydrated fatty oils, hydrogenated fatty oils and fatty acids having at least 7 carbon atoms, said fatty material comprising between 10 and 60 percent of the weight of the modified resin and said reaction being conducted in the presence of a catalyst selected from the group consisting of the hydrates of phosphorus pentoxide, dialkylsulphates, Ca(SO₄).H₂SO₄, sulphur trioxide and its compounds having the formula R—SO₃H wherein R is a radical selected from the group consisting of halogen, hydroxyl and aryl radicals and —OX wherein X is an alkyl radical, said catalyst calculated as phosphoric acid or sulphuric acid being present in amount between 0.1 and 4.0 percent by weight of the Novolak resin.

4. Process of preparing an oil-modified resinous composition which comprises reacting at a temperature between 115° C. and 215° C. a normally oil-insoluble, dehydrated Novolak resin prepared from a phenol which in part is unsubstituted phenol and with less than a mol of formaldehyde for each mol of phenol with a fatty material selected from the group consisting of raw fatty oils, oxidized fatty oils, heat-polymerized fatty oils, dehydrated fatty oils, hydrogenated fatty oils and fatty acids having at least 7 carbon atoms, and in the presence of an acidic catalyst selected from the group consisting of the hydrates of phosphorus pentoxide, dialkyl sulphates, Ca(SO₄).H₂SO₄, sulphur trioxide and its compounds having the formula R—SO₃H wherein R is a radical selected from the group consisting of halogen, hydroxyl and aryl radicals and —OX wherein X is an alkyl radical, said catalyst calculated as phosphoric acid or sulphuric acid being present in amount between 0.1 and 4.0 percent by weight of the Novolak resin.

5. Process of preparing an oil-modified resinous composition which comprises reacting at a temperature between 115° C. and 215° C. a normally oil-insoluble, dehydrated Novolak phenol-aldehyde resin with a fatty material selected from the group consisting of raw fatty oils, oxidized fatty oils, heat-polymerized fatty oils, dehydrated fatty oils, hydrogenated fatty oils and fatty acids having at least 7 carbon atoms and in the presence of an acidic catalyst selected from the group consisting of the hydrates of phosphorus pentoxide, dialkyl sulphates, Ca(SO₄).H₂SO₄, sulphur trioxide and its compounds having the formula R—SO₃H wherein R is a radical selected from the group consisting of halogen, hydroxyl and aryl radicals and —OX wherein X is an alkyl radical, said catalyst calculated as phosphoric acid or sulphuric acid being present in amount between 0.1 and 4.0 percent by weight of the Novolak resin, and then neutralizing the acidic catalyst with an alkali that forms a stable salt with the acidic catalyst after the fatty material has reacted with the Novolak resin.

ARTHUR P. MAZZUCCHELLI.